United States Patent [19]
Robison

[11] 3,866,946
[45] Feb. 18, 1975

[54] MOTORCYCLE STEERING HEAD ANGLE ADJUSTMENT
[75] Inventor: Gary A. Robison, Valcourt, Quebec, Canada
[73] Assignee: Bombardier Limited, Valcourt, Quebec, Canada
[22] Filed: Oct. 11, 1973
[21] Appl. No.: 405,276

[30] Foreign Application Priority Data
Oct. 26, 1972 Canada.............................. 154941

[52] U.S. Cl.................................. 280/279, 308/62
[51] Int. Cl............................................ B62k 19/00
[58] Field of Search ........... 280/276, 279, 280, 281; 308/62

[56] References Cited
UNITED STATES PATENTS

| 1,478,052 | 12/1923 | Oliver | 308/62 |
| 1,972,840 | 9/1934 | Graf | 308/62 X |
| 2,180,046 | 11/1939 | Gleissner | 308/62 |
| 2,986,086 | 5/1961 | Siebke | 308/62 |
| 3,342,507 | 9/1967 | Koch | 308/62 X |
| 3,635,103 | 1/1972 | Monti | 308/62 X |

FOREIGN PATENTS OR APPLICATIONS

| 523,424 | 4/1955 | Italy | 280/279 |
| 570,439 | 6/1945 | Great Britain | 280/279 |

Primary Examiner—David Schonberg
Assistant Examiner—Terrance L. Siemens

[57] ABSTRACT

The front fork of a motorcycle is carried by a steering spindle mounted for angular rotation about the axis of the steering spindle in the steering head member of a motorcycle frame. The steering spindle is rotatable in bearing assemblies at opposite ends of the steering head member of the motorcycle frame, and provision is made for adjustment of the steering head angle by the inclusion in at least one of these bearing assemblies of an eccentric member. The eccentric member is arranged for assembly alternatively in either of two diametrically opposed angular orientations to position the axis of steering spindle in a corresponding one of two angular positions in the central longitudinal vertical plane of the motorcycle frame. A series of eccentric members of different eccentricity may be provided so that a wide range of steering head angle adjustment may be provided. It is known to mount the front fork of a motorcycle in an angularly adjustable pivoted harness to achieve adjustment of the steering head angle, but this is prone to maladjustment during use, while adding to the weight and detracting from the aesthetic value of the machine.

10 Claims, 9 Drawing Figures

પ્ર3,866,946

MOTORCYCLE STEERING HEAD ANGLE ADJUSTMENT

FIELD OF THE INVENTION

The present invention relates to a mechanism for the adjustment of the steering head angle of the front fork of a motorcycle.

DESCRIPTION OF THE PRIOR ART

Various proposals have been made for achieving such adjustment in the past. In one arrangement the front fork of the motorcycle is provided with two spaced apart notches for receiving the axle of the front wheel. However with this arrangement it is not possible to achieve fine adjustments of the steering head angle since the spacing between the two notches is necessarily substantially larger than the diameter of the spindle of the front wheel. It has also been proposed to mount the front fork in an angularly adjustable pivoted harness, but this arrangement is prone to maladjustment during use. In a mounting arrangement where a steering spindle is journalled in opposite ends of the head tube of the motorcycle frame and carries a pair of forwardly extending plates at opposite ends thereof to support the front fork at a location spaced from the axis of the shaft, it has also been proposed to achieve adjustment of the steering head angle by adjusting the relative lengths of the plates. However this arrangement affects the geometry of the steering system by changing the angle between the fork and the steering axis.

SUMMARY OF THE INVENTION

The present invention provides a mechanism for adjustment of the steering head angle of the front fork of a motorcycle, said mechanism comprising: a steering spindle; two bearing means arranged at locations spaced longitudinally of the spindle, said bearing means mounting said spindle in a motorcycle frame for angular rotation about a generally upright axis in the central longitudinal vertical plane of the motorcycle; means coupling said front fork to said spindle in fixed relation thereto for rotation with said spindle; at least one of said bearing means including adjustment means operable to vary the angular position of said axis in said vertical plane thereby to vary the steering head angle of said front fork.

The steering spindle may be journalled for rotation in the steering head member of a motorcycle frame by a pair of self-aligning spherical ball or roller bearings mounted in opposite ends of the steering head member. In this arrangement the adjustment means may comprise an eccentric member engageable in the end of the steering head member and having an eccentric circular opening providing an annular seating surface for the bearing assembly. The eccentric member may be selectively engageable in the end of the steering head member alternatively in either of two diametrically opposed orientations to provide two corresponding angular positions for the axis of the steering spindle. If such an eccentric member is provided at each end of the steering head member, four angular positions of the axis of the steering spindle are available. The range of angular adjustment of this axis in a vertical plane may be further increased by providing a series of eccentric members each having degree of eccentricity slightly different to that of the other members, so that by assembling the appropriate eccentric members, any selected angular position of the axis within the given range, may be achieved. For example a range of adjustment of steering head angle of about 6° is sufficient to cover most present-day requirements, and may be achieved by providing four pairs of eccentrics, having eccentricities providing 0°, 1°, 2° and 3° of angle adjustment respectively.

By providing for the adjustment of the steering head angle as herein proposed, it is possible to utilize a single basic motorcycle frame and yet still achieve a relatively low steering head angle for a motorcycle intended for highway use, or a relatively high steering head angle where the motorcycle is intended primarily for off-road use. Thus manufacturing costs are significantly reduced.

The invention also contributes to vehicle safety in that, since the motorcycle is provided with means for adjustment of the steering head angle, there is no temptation for the owner to modify the motorcycle to achieve a desired value. A common, and potentially hazardous, modification in motorcycles lacking the steering head angle adjustment has been to saw through the motorcycle frame to the rear of the steering head member, and then to weld the frame back together at the desired steering head angle. This modification, apart from its permanent nature, has the disadvantage that the parting and rewelding is usually done at the most highly stressed location in the frame which is therefore a potential source of failure.

BRIEF DESCRIPTION OF THE DRAWING

The invention will further be described, by way of example only, with reference to the accompanying drawings in which.

DESCRIPTION OF THE PREFERRED EMBODIMENTS

Figure 1:
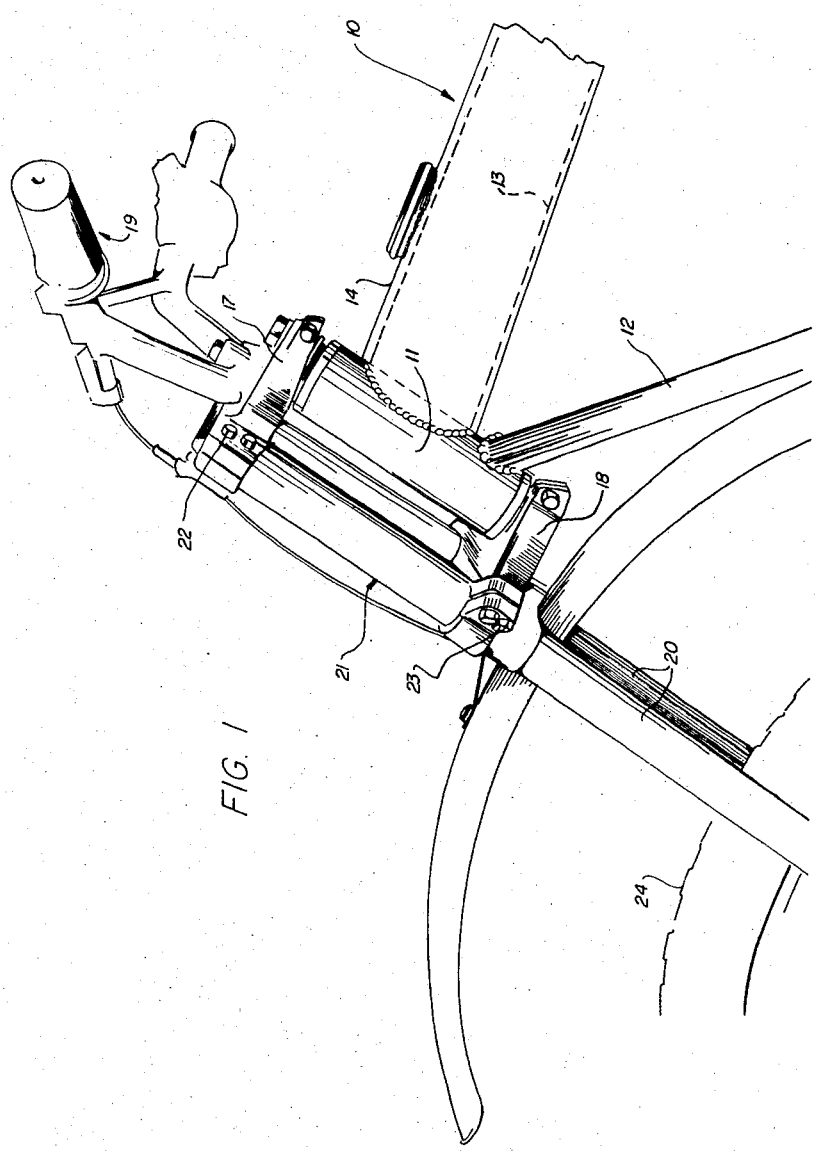
FIG. 1 is a fragmentary side view of the front portion of a motorcycle incorporating a mechanism for adjustment of the steering head angle in accordance with the invention.
Figure 3:
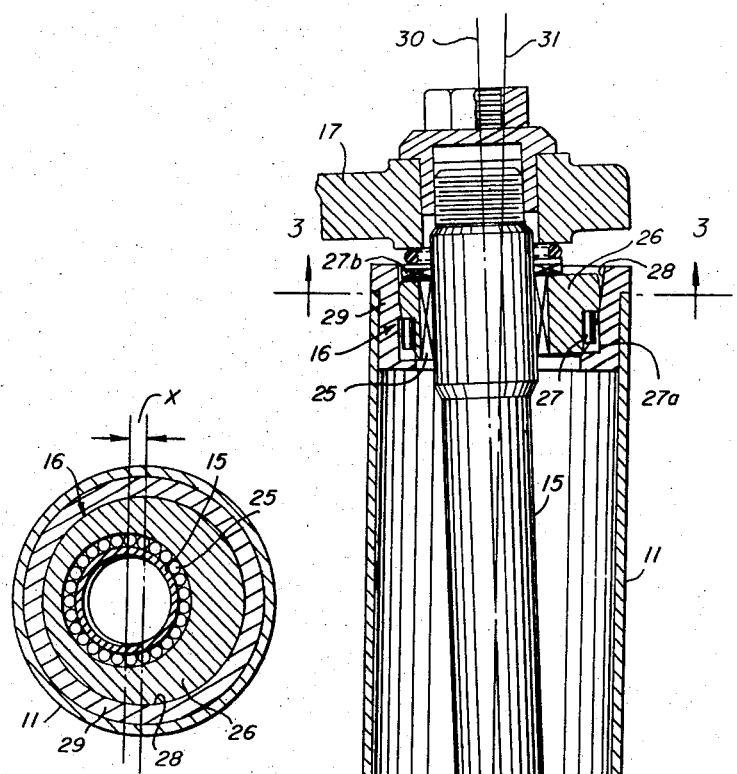
FIG. 3 is a cross-sectional view taken on the line 3—3 in FIG. 2.
Figure 2:
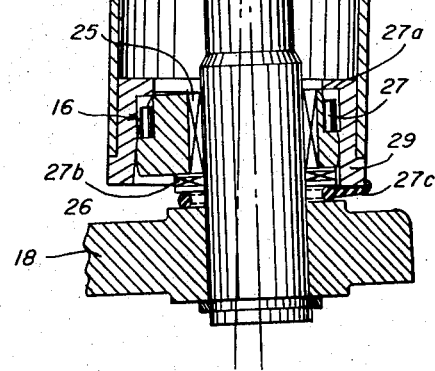
FIG. 2 is a fragmentary longitudinal sectional view through the head tube of the motorcycle frame.

Referring first to FIGS. 1, 2 and 3, the motorcycle illustrated in FIG. 1 comprises a frame generally indicated at 10 comprising a steering head member 11 fixed in a generally upright position in the central longitudinal plane of the frame. A down tube 12 is fixed, as by welding, near the bottom of the steering head member, and a rearwardly extending frame member 13 is secured to a medial portion of the steering head member as by welding. As illustrated, the frame member 13 supports a fuel tank 14. Extending in a generally axial direction through the steering head tube is a steering spindle 15 supported for angular rotation about its axis in bearing assemblies 16 at opposite ends of the member 11.

The upper and lower ends of the spindle 15 extend through, and are secured to clamping plates 17 and 18 respectively. The plates 17 and 18 extend in planes at right angles to the axis of the spindle 15, and are of generally triangular configuration, increasing in width forwardly of the spindle. A handle bar assembly 19 is secured in conventional manner to the upper clamping plate 17. Parallel tubular limbs 20 of the front fork 21 of the motorcycle extend through aligned bores in the upper and lower clamping plates 17 and 18, and are secured thereto by conventional fastening means illustrated at 22 and 23 respectively. The front wheel 24 of the motorcycle is rotatably supported at the lower end of the front fork (not shown) in a conventional manner.

Referring to FIGS. 2 and 3, each bearing assembly 16 comprises a roller bearing 25 the inner race of which is formed by the spindle 15, and an outer race formed by a bearing cone 26 carried in a seat 28 in a bearing cup 29 positioned in one end of the steering head member 11. The bearing cone 26 has a spherically curved outer surface, the seating surface 28 being correspondingly curved. A pair of keys 27 are carried by the bearing cone 26 at diammetrically opposed positions and engage in corresponding key ways 27a in the bearing cup 29. Thus the bearing cone 26 can be assembled selectively in either of two diammetrically opposed orientations.

As is best seen in FIG. 3, the seating surface 28 is eccentric with respect to the bearing 25 and the end of the member 11, the amount of eccentricity being indicated at X in FIG. 3. The bearing cup 29 is detachably received in the end of the head member 11, in non-rotatable manner, and detent means or the like (not shown) may be provided to prevent unintended rotation of the bearing seat from the position shown in FIGS. 2 and 3. In this position it will be seen that the axis 30 of the steering head spindle 15 lies at an angle to the axis 31 of the steering head member 11. This angle may be altered by disassembling the steering head assembly, removing the bearing cone 26, and reassembling the latter in an orientation diammetrically opposed to that shown in FIG. 3, i.e., rotated 180° from the position shown. Where the counter bores of both of the bearing cores 26 are eccentric, as shown it is possible to vary the angle between the axis 30 and 31 to four different settings, and thus obtain adjustment of the steering head angle between four different values. Furthermore, it is envisaged that a series of bearing seats would be provided having different values for the eccentricity X so that a large range of adjustment of the steering head angle is possible.

It will be appreciated that adjustment of the steering head angle in the way described does not produce any unfavourable change in the geometry of the steering system since the mounting arrangement of the front fork is such that it is fixed in relation to the steering head spindle 15.

The bearing assembly 16 will preferably include thrust bearings 27b to absorb axial loads on the steering assembly, and in practice will normally be enclosed by sealing means such as a rubber boot 27c (FIG. 2) to prevent the ingress of dirt or dust to the bearing surfaces.

Figures 4, 5:
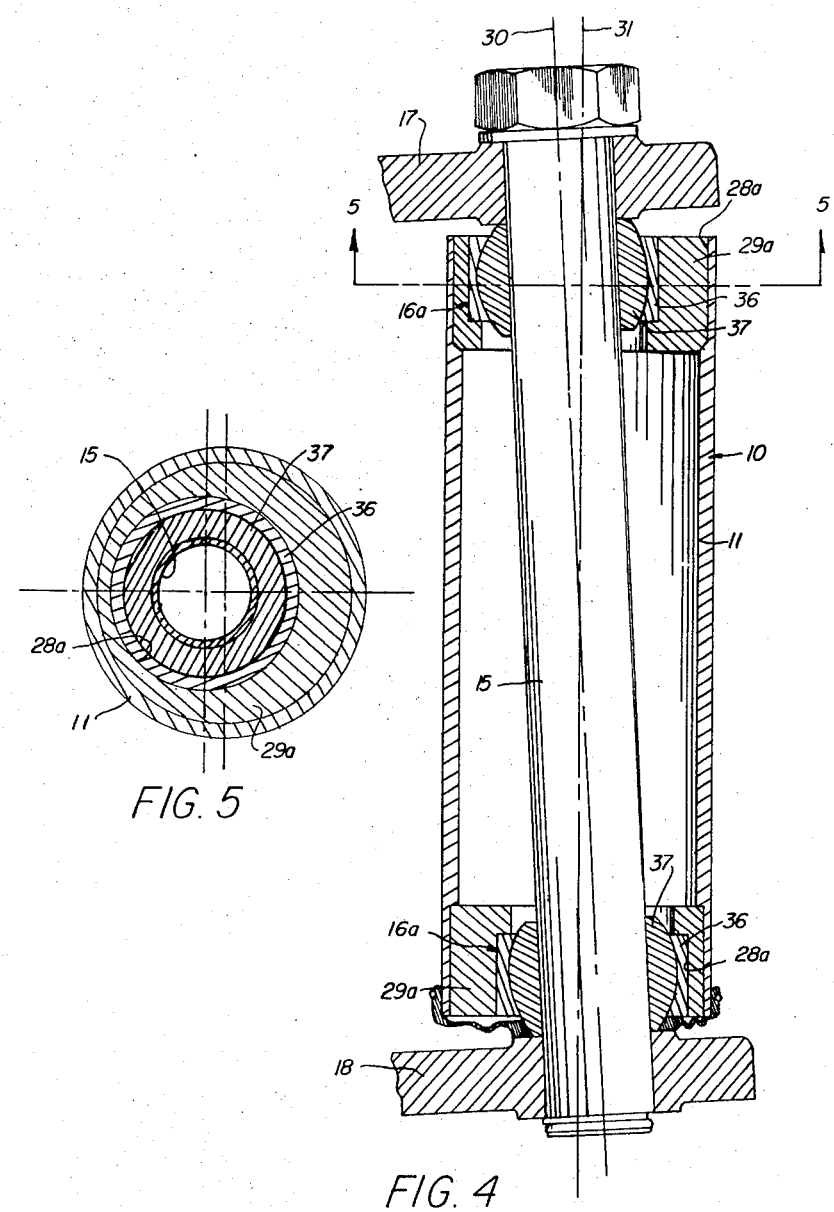
FIG. 4 is a view corresponding to FIG. 2 illustrating an alternative embodiment.
FIG. 5 is a sectional view taken on the line 5—5 in FIG. 4.

In the alternative construction illustrated in FIGS. 4 and 5 the seating surface 28a of each bearing cup 29a is eccentric and receives a bearing race 36 having a spherically curved internal surface mating with a spherically curved outer surface of a bearing bush 37 fixed to move with the spindle 15. The bearing race 36 and bearing bush 37 are of suitable low friction material to permit rotational movement of the shaft 15. The bearing is mounted in the eccentric counter bore seating surface 28a in the bearing cup 29a positioned in the end of the steering head member 11. It will be evident from the design that in addition to permitting rotary movement of the spindle 15, the bearing assemblies 16a, by virtue of the arrangement of the mating spherical bearing surfaces, also perform as thrust bearings to prevent relative axial movement between the spindle 15 and the steering head member 11. The bearing cups 29a are carried in the ends of the steering head member 11 in non-rotatable manner, e.g., through the use of keys (not shown). As with the embodiment of FIGS. 2 and 3, the steering head angle can be adjusted in this case by reorientation of one or both of the bearing cups 29a, and additional bearing cups may be provided if further variations in the steering head angle are required.

Figures 6, 7:
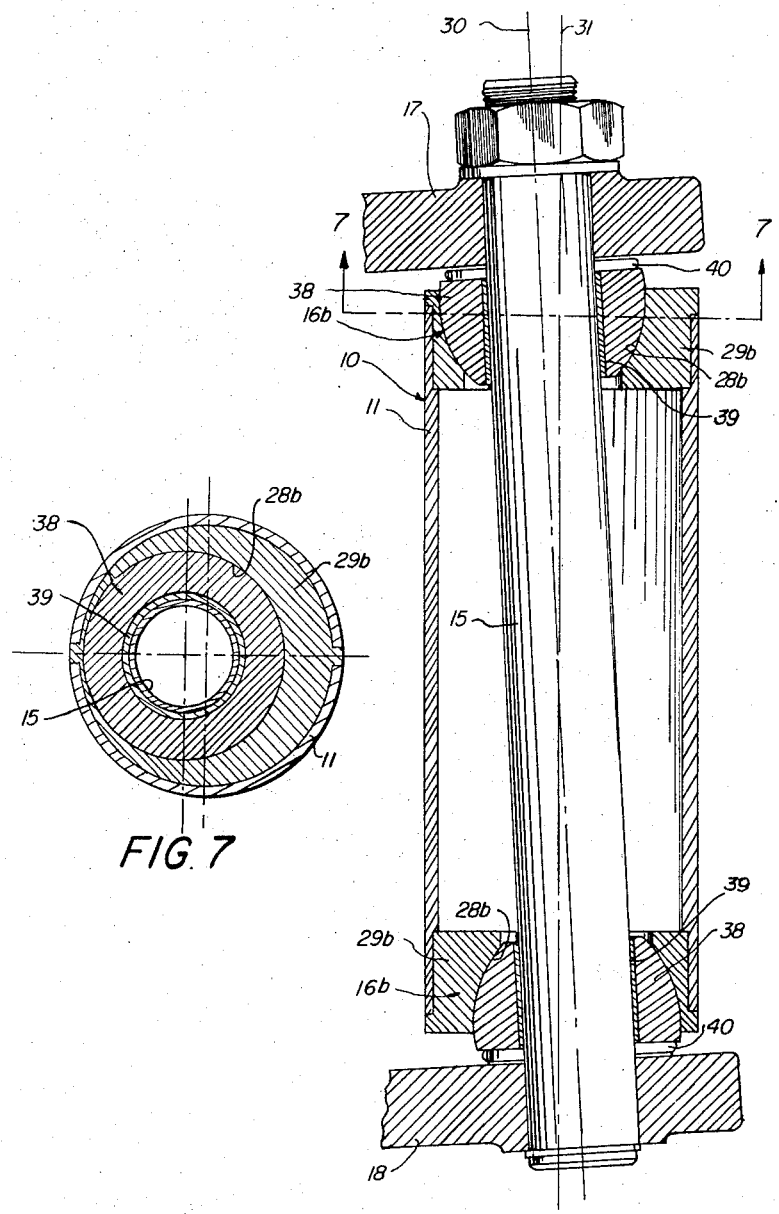
FIG. 6 is a view corresponding to FIGS. 2 and 4, illustrating a further alternative embodiment.
FIG. 7 is a sectional view taken on a line 7—7 in FIG. 6.

In the embodiment of FIGS. 6 and 7, each bearing cup 29b has a spherically curved internal surface 28b which engages a mating spherical surface on a bearing cone 38. Each bearing cone 38 has a central bore in which is positioned a tubular journal bearing shell 39 in which the spindle 15 is journaled for rotation. The bearing cups 29b are positioned in non-rotatable manner in the ends of the steering tube member 11 but can be assembled selectively in either of two diametrically opposed orientations to effect adjustment in the steering head angle.

Between the outermost axial end of each bearing shell, and the adjacent plate 17 or 18, is positioned an annular thrust bearing element 40 to absorb axial loads between the bearing retainer and the adjacent plate.

Figures 8, 9:
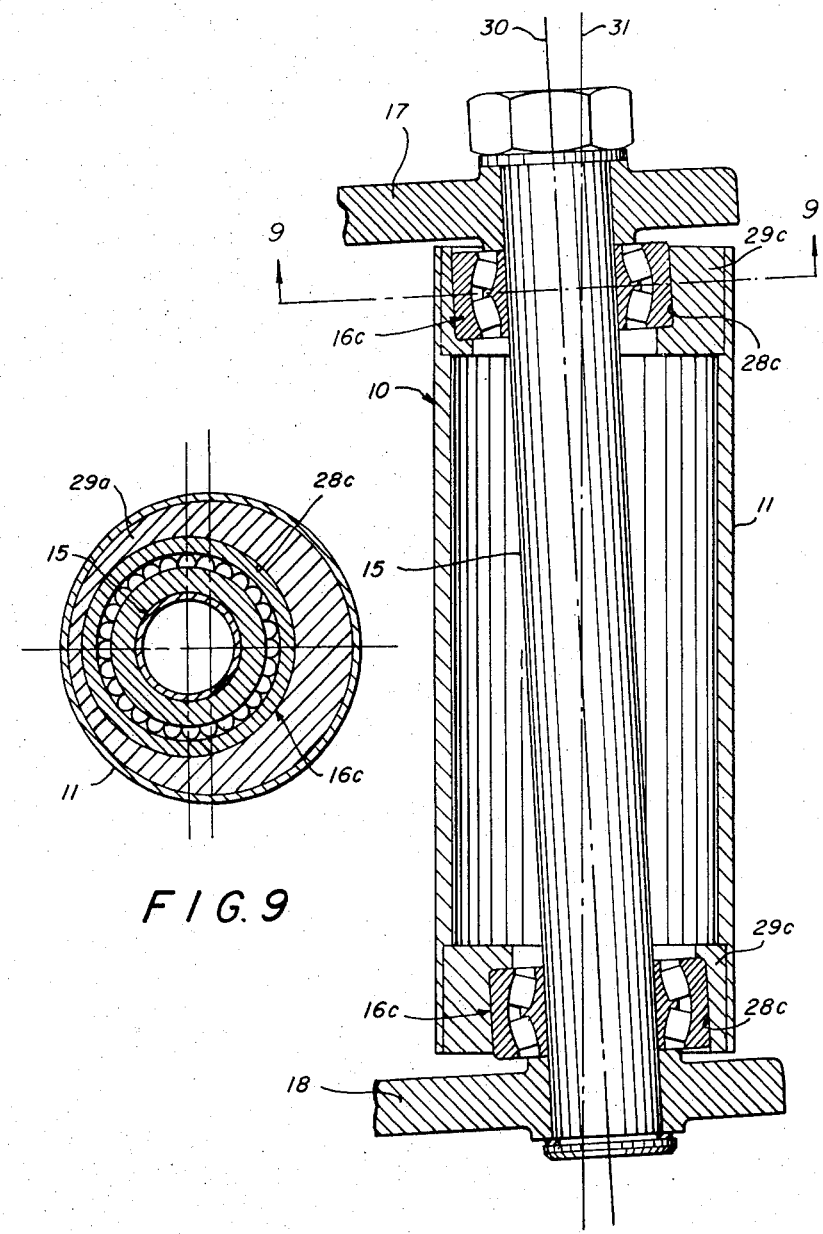
FIG. 8 is a view corresponding to FIG. 2 showing a further alternative embodiment.
FIG. 9 is a sectional view taken on the line 9—9 in FIG. 8.

The embodiment of FIGS. 8 and 9 comprises an eccentric bearing cup 29c received in each end of the steering head member 11 the eccentric counterbore 28c of the bearing cup forming a seating for a self-aligning spherical ball or roller thrust bearing 16c. Adjustment of steering head angle is achieved in a similar manner as is described in relation to the embodiments of FIGS. 4 to 6.

What I claim as my invention is:

1. A mechanism for adjustment of the steering head angle of the front fork of a motorcycle, said mechanism comprising; a steering head spindle; two bearing means arranged at locations spaced longitudinally of the spindle, said bearing means mounting said spindle in a motorcycle frame for angular rotation about a generally upright axis in the central longitudinal vertical plane of the motorcycle; means coupling said front fork to said spindle in fixed relation thereto for rotation with said spindle; one of said bearing means including adjustment means operable to vary the angular position of said axis in said vertical plane thereby to vary the steering head angle of said front fork.

2. An adjustment mechanism according to claim 1 wherein each of said bearing means includes such adjustment means.

3. An adjustment mechanism according to claim 1 wherein said adjustment means comprises an eccentric member in said bearing means, said eccentric member being selectively engageable in said bearing means alternatively in either of two diammetrically opposed orientations to position said axis in a corresponding one of two angular positions in said plane.

4. An adjustment mechanism according to claim 3 wherein each of said bearing means includes such an adjustment means such that each bearing means is independently selectively engageable to provide two alternative angular positions for said axis.

5. An adjustment means according to claim 1 wherein said frame includes a steering head member through which said spindle extends, said bearing means comprising self-aligning spherical ball or roller thrust bearing assemblies mounted at opposite ends of said steering head member, said bearing assemblies each including relatively rotatable inner and outer races in fixed relation to the spindle and steering head member respectively, said adjustment means comprising an eccentric member in one of said bearing assemblies mounted between one of said races and the associated spindle or steering head member, said eccentric member being engageable alternatively in two diammetrically opposed angular orientations.

6. An adjustment mechanism according to claim 5 wherein such adjustment means is provided in both of said bearing assemblies.

7. An adjustment mechanism according to claim 1 wherein said frame includes a steering head member through which said spindle extends, said bearing means each comprising a tubular journal bearing fitting over said spindle and carried in an annular bearing retainer the bearing retainer being received in an annular seating surface in a bearing cup, mounted in a respective end of said steering head member, at least one of said bearing cups having a seating surface which is eccentric with respect to the end of the steering head member and being engageable therewith alternatively in two diammetrically opposed angular orientations, in each bearing means the bearing surface of said bearing cup and the mating surface of said bearing retainer being spherically curved to accommodate alignment of the spindle in each of the orientations of the eccentric bearing cup.

8. An adjustment mechanism according to claim 7 wherein each of said bearing cups includes such an eccentric seating surface.

9. An adjustment mechanism according to claim 8 in combination with a series of replacement bearing cups of different eccentricities which can be added to the assembly to provide a range of variations in the steering head angle.

10. An adjustment mechanism according to claim 3 wherein said eccentric member comprises a bearing cone having an eccentric bore in which said spindle is rotatably received, and a spherically curved outer surface received in a mating surface in a cup carried in a steering head member of the motorcycle frame, said bearing cone being engageable in said cup selectively in either of two diammetrically opposed orientations said bearing means including key means operative to prevent relative rotation between said bearing cone and said cup.

* * * * *